May 2, 1961     H. MULTER     2,982,558

CHUCK HAVING COUNTERBALANCED JAWS

Filed June 2, 1958

INVENTOR.
HOWARD MULTER
BY
Lindsey and Pritzman
ATTORNEYS

United States Patent Office 2,982,558
Patented May 2, 1961

2,982,558
CHUCK HAVING COUNTERBALANCED JAWS
Howard Multer, West Hartford, Conn., assignor to The Skinner Chuck Company, New Britain, Conn., a corporation of Connecticut
Filed June 2, 1958, Ser. No. 739,036
4 Claims. (Cl. 279—123)

This invention relates to improvement in chucks and more particularly to a chuck having means for improving the efficiency of the work-holding jaws. Although not limited thereto, the invention is particularly advantageous for use with chucks of the type which are provided with means for actuating the chuck jaws while the chuck is in motion.

The object of the invention is to provide novel means for overcoming the disadvantageous effects of centrifugal force which normally acts on the radially movable jaws of a chuck while the chuck is rotating tending to open the jaws and also making it more difficult to close the jaws while the chuck is in motion. Included in this object is the provision of counterbalancing means which is of simple construction and can be applied to the chuck without interfering with the normal operation therefor and which not only will counteract the undesirable effect of centrifugal force on the jaws but if desired, may be utilized to actually increase the gripping action of the jaws.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

Figure 1:
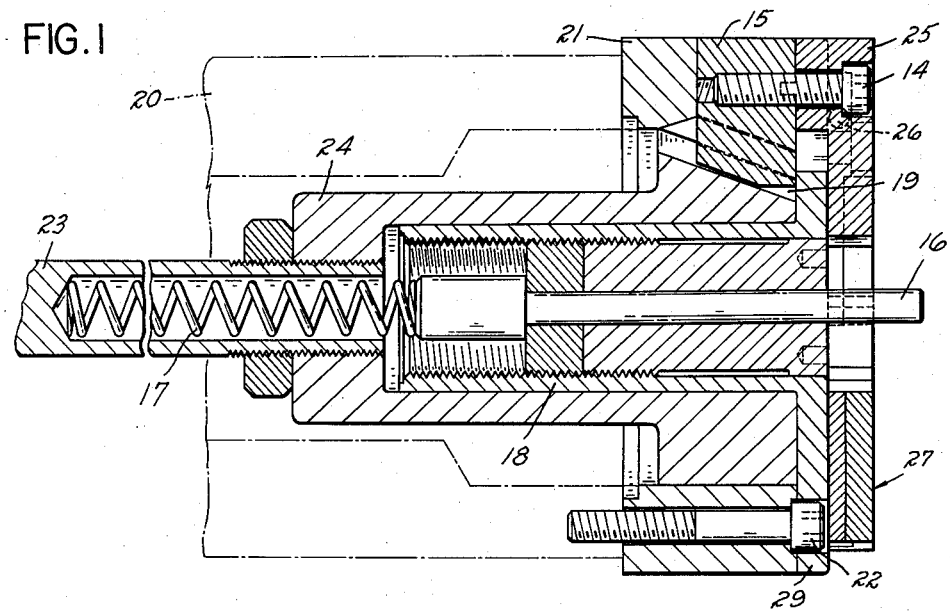
Figure 3:
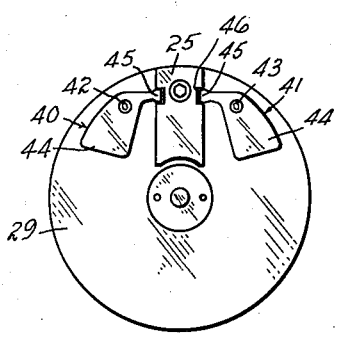
Figure 2:
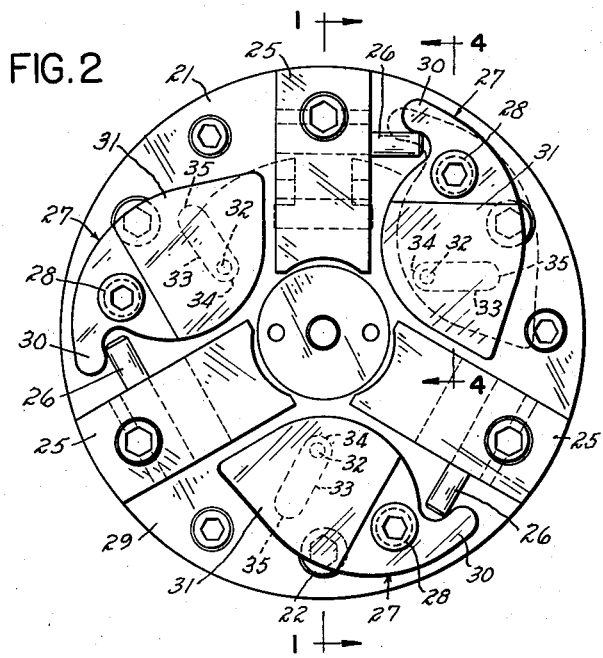
Figure 4:
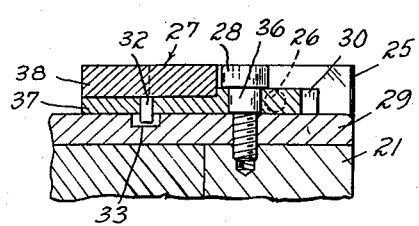

In the drawings:
Fig. 1 is a sectional view taken along lines 1—1 of Fig. 2 of a chuck employing the invention;
Fig. 2 is a front view of the chuck shown in Fig. 1;
Fig. 3 is a front view of the chuck showing only one of the jaws in connection with a modification of the invention; and
Fig. 4 is an enlarged partial sectional view taken along lines 4—4 of Fig. 2.

Referring to the drawings, the invention is shown applied to a chuck of the type utilizing a draw bar for opening and closing the chuck jaws, although the invention is not necessarily limited to this type of chuck. The body 21 of the chuck may be of a conventional type for attachment to a spindle indicated in dotted lines 20 in any convenient manner such as by bolts 22. An axially movable draw bar 23 is connected to a draw bar collar 24 which slidably telescopes over the center sleeve 18 of the chuck and is connected by an inclined T slot and tongue connection 19 to the master jaws 15 to operate the jaws radially responsive to axial movement of the draw bar 23. The pin 16 which is slidably mounted in the sleeve 18 and is biased forwardly by spring 17 is a conventional ejector pin and may be disregarded so far as the present invention is concerned.

The chuck as shown in Fig. 2 has three master jaws 15 on which are mounted the top or work gripping jaws 25 for movement therewith radially of the chuck, the top jaws 25 being secured to the master jaws 15 by bolts 14.

In accordance with the invention, each of the jaws has a pin 26 secured to a side surface thereof and extending at right angles thereto for engagement by counterbalance 27 which is pivotally mounted on face plate 29 of the chuck adjacent each jaw by means of a pivot pin such as cap screw 28. Each counterbalance has a finger portion 30 bearing against the pin 26 and a main body portion 31 with said main body portion constituting an inertial mass which places the mass center on the opposite side of the pivot from the finger 30 to exert a force acting radially inward on the associated jaw when the counterbalance is urged outwardly by centrifugal force when the chuck is rotated.

The angular displacement of each counterbalance about its pivot is restricted by a limit pin 32 disposed on the underside of the counterbalance which is free to move in a slot 33 formed in the face plate 29. The configuration of the counterbalance is such that it will be entirely within the circumference of the chuck body at all times and yet will not interfere with the jaws. As shown in detail in Fig. 4, the counterbalance 27 is preferably formed with a base plate 37 pivotally mounted on the hub 36 of the cap screw 28, and has attached thereto a weight 38 having the desired counterbalancing mass, the weight 38 being secured to the base plate in any convenient manner, such as by screws, welding or the like.

The modification of the invention presented in Fig. 3 shows the use of two weights instead of a single weight in connection with each jaw. In this modification, two counterbalances 40 and 41 are pivotally mounted by screws 42 and 43 to the face plate 29 on either side of the jaw. Each of the counterbalances 40 and 41 is generally similar to the single counterbalance 27 previously described and includes a main body portion 44 and finger portions 45. The finger portions 45 are received in notches 46 in the sides of the jaws 25 so that as the weights tend to swing outwardly, a radially inward force is applied to the jaws. The counterbalances arranged as in Fig. 3 provide for substantially equal force radially inwardly on opposite sides of the jaw which is advantageous to overcome any tendency for the jaws to cant or tilt in their guideways.

In operation, when the chuck is revolved at high speeds, the centrifugal force exerted upon the jaws normally tends to move the jaws radially outward thereby reducing the gripping action of the jaws on the work piece and also making it difficult to close the jaws while the chuck is in operation. In accordance with the invention, this tendency of the jaws to move outwardly in a radial direction is overcome by the counterweights which tend to drive the jaws in the opposite direction. If desired, the counterweights may be designed to exert a radially inward force on the jaws substantially equal to the centrifugal force exerted upon the jaws in the opposite direction, or if desired, the counterbalances may be designed so that the radially inward force exerted on the jaws is actually greater than the centrifugal force exerted on the jaws thereby not only neutralizing the tendency of the jaws to open, but actually tending to cause the jaws to more effectively hold the work and assisting the jaw closing operation while the chuck is in motion.

As many changes could be made in the above construction by one skilled in the art, it is intended that such variations and modifications are to be included within the scope of the invention.

I claim:
1. In a chuck, a chuck body adapted to be rotated, a plurality of jaws mounted on the chuck body for movement radially of the chuck, means for adjustably positioning said jaws relative to said chuck body to exert a gripping force on a workpiece when the chuck is stationary, a weight pivotally mounted adjacent each jaw for swinging movement responsive to centrifugal force when the chuck is rotated, and means interconnecting the jaws and the weights independently of the jaw positioning means to apply a radially inward force on the jaws when the weight is subjected to centrifugal force.

2. In a chuck, a chuck body adapted to be rotated, a plurality of jaws mounted on the chuck body for movement radially of the chuck, means for adjustably positioning said jaws relative to said chuck body to exert a gripping force on a workpiece when the chuck is stationary, a pivot adjacent each jaw, and a counterbalance mounted on each pivot having a portion on one side of the pivot interconnected with the adjacent jaw independently of the jaw positioning means and having the major portion of its weight on the other side of the pivot whereby a radially inward force is applied to the jaws responsive to centrifugal force acting on the counterbalances during rotation of the chuck.

3. In a chuck, a chuck body adapted to be rotated, a plurality of jaws mounted on the chuck body for movement radially of the chuck, means for adjustably positioning said jaws relative to said chuck body to exert a gripping force on a workpiece when the chuck is stationary, a plurality of weights pivotally mounted on the chuck for movement responsive to centrifugal force when the chuck is rotated, and means independent of the jaw positioning means interconnecting the weights with the jaws to apply a radially inward force on the jaws when the weights are subjected to centrifugal force, said weights having an effective mass relative to that of the jaws so as to produce a net radially inward force on the jaws when the jaws and the weights are subjected to centrifugal force.

4. In a chuck of the type having a chuck body, a plurality of jaws mounted for movement radially of the chuck, means for adjustably positioning said jaws relative to said chuck body to exert a gripping force on a workpiece when the chuck is stationary, and a draw bar extending axially of the chuck for opening and closing the jaws, the combination therewith of a plurality of weights pivotally mounted on the chuck and each connected independently of the jaw positioning means to one of the jaws to counterbalance the tendency of the jaws to move radially outwardly responsive to centrifugal force when the chuck is rotated.

References Cited in the file of this patent

UNITED STATES PATENTS

| | | |
|---|---|---|
| 1,440,161 | Lippincott | Dec. 26, 1922 |
| 2,207,621 | Hite | July 9, 1940 |
| 2,333,680 | Schneider et al. | Nov. 9, 1943 |
| 2,785,904 | Garrison et al. | Mar. 19, 1957 |
| 2,828,134 | Buck | Mar. 25, 1958 |